United States Patent
Emin et al.

(10) Patent No.: US 8,394,346 B2
(45) Date of Patent: Mar. 12, 2013

(54) METHOD FOR TREATING SPENT NUCLEAR FUEL

(75) Inventors: Jean Luc Emin, Montigny-le-Bretonneux (FR); Francois Drain, Saint Nom la Bretechè (FR); Francois Poncelet, Le Vesinet (FR); Binh Dinh, Pont Saint Esprit (FR); Philippe Pradel, Paris (FR); Pascal Baron, Bagnols sur Ceze (FR); Michel Masson, Avignon (FR)

(73) Assignees: Areva NC, Paris (FR); Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/380,456

(22) PCT Filed: Jun. 29, 2010

(86) PCT No.: PCT/EP2010/059232
§ 371 (c)(1),
(2), (4) Date: Feb. 8, 2012

(87) PCT Pub. No.: WO2011/000844
PCT Pub. Date: Jan. 6, 2011

(65) Prior Publication Data
US 2012/0128555 A1    May 24, 2012

(30) Foreign Application Priority Data
Jul. 2, 2009  (FR) ...................................... 09 54532

(51) Int. Cl.
*C01G 56/00* (2006.01)

(52) U.S. Cl. ................................. 423/8; 423/9; 423/10
(58) Field of Classification Search ................. 423/8–10
See application file for complete search history.

(56) References Cited

U.S. PATENT DOCUMENTS 4,278,559 A    7/1981  Levenson et al.
(Continued)

FOREIGN PATENT DOCUMENTS

| FR | 2870841 A | 12/2005 |
| WO | 2007135178 A1 | 11/2007 |

OTHER PUBLICATIONS

International Search Report issued on Dec. 2, 2010 for International Application No. PCT/EP2010/059232.
(Continued)

*Primary Examiner* — Steven Bos
(74) *Attorney, Agent, or Firm* — Knobbe Martens Olson and Bear, LLP

(57) ABSTRACT

A method for treating spent nuclear fuel, which includes first decontaminating the uranium, plutonium and neptunium found in a nitric aqueous phase resulting from dissolving the nuclear fuel in $HNO_3$. The uranium, plutonium and neptunium found in the solvent phase is then split in a first aqueous phase and a second aqueous phase. Next, the first aqueous phase is stored. Following, the plutonium or other mixtures found in the first aqueous phase is purified relative to the fission products still found in said phase, in order to obtain, at the end of said purification, an aqueous solution containing a mixture of Pu and U or Pu, U and Np. Finally the resulting mixture of Pu and U or the mixture of Pu, U and Np is co-converted into a mixed oxide.

36 Claims, 3 Drawing Sheets

U.S. PATENT DOCUMENTS

| | | | |
|---|---|---|---|
| 6,623,710 B1 * | 9/2003 | Gaubert et al. | 423/8 |
| 7,829,043 B2 | 11/2010 | Grandjean et al. | |
| 7,887,767 B2 | 2/2011 | Baron et al. | |
| 2005/0288542 A1 * | 12/2005 | Grandjean et al. | 588/313 |
| 2008/0089819 A1 * | 4/2008 | Moulin | 423/8 |

OTHER PUBLICATIONS

French Patent Office Search Report for Application No. 0954532, dated Feb. 26, 2010, in 2 pages.

* cited by examiner

METHOD FOR TREATING SPENT NUCLEAR FUEL

RELATED APPLICATIONS

This application is a U.S. National Phase of International Application No. PCT/EP2010/059232, filed Jun. 29, 2010, designating the U.S., and published in French as WO 2011/000844 on Jan. 6, 2011 which claims the benefit of French Patent Application No. 0954532 filed Jul. 2, 2009.

BACKGROUND OF THE INVENTION

1. Field of the Invention

The present invention relates to a method for processing used nuclear fuels, which has, among other advantages, that of avoiding on the site where these fuels are processed, storage of purified plutonium (i.e. totally decontaminated from fission products), even mixed with uranium or uranium and neptunium.

This method notably finds application in the processing of uranium oxide fuels and of mixed uranium and plutonium oxide fuels.

2. Description of the Related Art

Factories for processing used nuclear fuels today use the PUREX (for Plutonium Uranium Refining by EXtraction) method for recovering uranium and plutonium present in these fuels.

This is obtained by applying several purification cycles by liquid-liquid extraction. The extractant used is tri-n-butyl phosphate which has particularly affinity for uranium and plutonium.

The PUREX method, as it is applied in the factory UP2-800 of La Hague in France, schematically comprises three cycles, i.e.:
- a first cycle which aims at decontaminating together uranium and plutonium from two actinides(III), americium and curium, as well as from the major portion of fission products, and at achieving a partition of the uranium and of the plutonium into two flows; and
- two complementary cycles, designated as <<second uranium cycle>> and <<second plutonium cycle>> respectively and which aim at separately purifying the uranium and plutonium after their partition.

Recently an important development of the PUREX method, designated as COEX™ (for COEXtraction) method, was proposed in the PCT international application published under the number WO 2007/135178 [1].

Indeed, this development while ensuring uranium and plutonium recovery and purification comparable with those obtained in the PUREX method, gives the possibility of considerably reducing the risks of misappropriation of plutonium for military purposes.

It also allows production of a flow containing a mixture of plutonium, uranium and possibly neptunium totally decontaminated from fission products and the use of this flow for supplying a workshop, a so-called <<co-conversion>> workshop, the function of which is to prepare by oxalic precipitation, a mixed oxide $(U,Pu)O_2$ or $(U,Pu,Np)O_2$ which may be directly used for making nuclear fuels of the MOX (Mixed OXide fuel) type.

To do this, the COEX™ method after operations for decontaminating the uranium and the plutonium similar to the ones applied in the first cycle of the PUREX method, intends to achieve partition of uranium and of plutonium so as to obtain a first flow containing plutonium, uranium and, possibly neptunium, and a second flow containing uranium and possibly neptunium but not containing any plutonium.

It also intends to maintain, in all the operations located downstream from this partition, the plutonium in the presence of uranium and possibly of neptunium until a mixed oxide $(U,Pu)O_2$ or $(U,Pu,Np)O_2$ is obtained.

Thus, in the COEX™ method, the <<second plutonium cycle>> of the PUREX method is replaced with a cycle which aims at purifying the plutonium and uranium and if necessary the neptunium present in the first flow stemming from the partition, from fission products which may still be present in this flow.

In order to ensure decoupling between the operation of the workshops responsible for the processing of used nuclear fuels and that of workshops responsible for making MOX nuclear fuels and to thereby avoid that the production of MOX nuclear fuels is subject to processing of the used nuclear fuels, the COEX™ method comprises a storage step.

This storage is located either between the cycle aiming at purifying the plutonium and uranium and if necessary the neptunium present in the first flow stemming from the partition and the co-conversion, i.e. just after co-conversion.

In the first case, this is a mixture of plutonium, uranium and possibly neptunium purified in an aqueous solution which is stored, while in the second case, this is a mixture of plutonium, uranium and possibly neptunium purified in a solid form which is stored.

With the perspective of making misappropriation of plutonium for military purposes even more difficult during the processing of used nuclear fuels, the Inventors set the goal of providing a method which, while having the same advantages of the COEX™ method, i.e.:
- never leaving plutonium alone,
- producing a flow containing a mixture of plutonium, uranium and possibly neptunium free of fission products, capable of being converted into a mixed oxide $(U,Pu)O_2$ or $(U,Pu,Np)O_2$ by oxalic co-precipitation, and
- ensuring functional decoupling between the processing of used nuclear fuels and the making of new nuclear fuels, further has the advantage of avoiding that purified plutonium, even mixed with uranium or with uranium and neptunium, be stored on the site where the used nuclear fuels are processed.

They also set the goal that accumulation of these advantages leads to a method, the industrial exploitation of which is not more any complex than that of the COEX™ method and even gives the possibility of obtaining, if possible, a simpler method to be applied industrially than the latter.

SUMMARY OF THE INVENTION

These goals and still other ones are achieved by the invention which proposes a method for processing a used nuclear fuel, comprising:

a) decontamination of the uranium, plutonium and neptunium present in a nitric aqueous phase resulting from the dissolution of this nuclear fuel in nitric acid, from actinides (III) and from the major portion of the fission products also found in this phase, this decontamination comprising at least one operation for co-extracting uranium in the oxidation state VI, plutonium in the oxidation state IV, and neptunium in the oxidation state VI, in a solvent phase, non-miscible with water and containing at least one extractant in an organic diluent, and at least one operation for washing the solvent phase obtained at the end of this co-extraction operation with a nitric aqueous phase;

b) partition of the uranium, plutonium and neptunium present in the solvent phase obtained at the end of step a) into a first and a second aqueous phase, the first aqueous phase either containing plutonium without any uranium or neptunium, or a mixture of plutonium and uranium without neptunium, or further a mixture of plutonium, uranium and neptunium, and the second aqueous phase either containing a mixture of uranium and neptunium without any plutonium, or uranium without any plutonium or neptunium;

c) storage of the first aqueous phase obtained at the end of step b);

d) purification of the plutonium or of the mixture of plutonium and uranium, or further of the mixture of plutonium, uranium and neptunium, present in the first aqueous phase obtained at the end of step c) from fission products still found in this phase, this purification comprising at least one addition of uranium in order to obtain, at the end of this purification, an aqueous solution containing either a mixture of plutonium and of uranium, or a mixture of plutonium, uranium and neptunium; and e) co-conversion of the mixture of plutonium and uranium, or of the mixture of plutonium, uranium and neptunium, present in the aqueous phase obtained at the end of step d) into a mixed oxide.

Thus, in the method of the invention:

plutonium is never left alone since, up to the purification step d), it is at least associated with fission products, or even with uranium or with a mixture of uranium and neptunium depending on how the partition step b) is achieved, while from the purification step d) which aims at totally ridding it of fission products, it is at least associated with uranium, or even with a mixture of uranium and neptunium;

the purification step d) gives the possibility of producing an aqueous solution containing a mixture of plutonium, uranium and possibly neptunium, free of fission products, capable of being converted into a mixed oxide;

the functional decoupling between the processing of used nuclear fuels and the making of new nuclear fuels is ensured by a storage step but which is located between the partition step b) and the purification step d) so that the aqueous phase which is stored, contains plutonium not having been yet purified with regard to fission products.

The method of the invention in this way gives the possibility of avoiding the presence of purified plutonium, even mixed with uranium or uranium and neptunium on the site where the used nuclear fuel is processed.

In a first preferred embodiment of the method of the invention, step b) is achieved so that the first aqueous phase containing plutonium but without any uranium or neptunium, and the second aqueous phase contains uranium and neptunium but without any plutonium.

Consequently, in this first embodiment, step b) preferably comprises:

$b_1$) an operation for stripping the plutonium present in the solvent phase obtained at the end of step a), this plutonium being stripped in the oxidation state III by means of a nitric aqueous phase containing a reducing agent with which plutonium(IV) may be reduced into plutonium(III) and neptunium(VI) into neptunium(IV) without reducing the uranium, for example uranous nitrate—or uranium(IV)—stabilized by an anti-nitrous agent, for example hydrazinium nitrate;

$b_2$) an operation for stripping the uranium and neptunium present in the solvent phase obtained at the end of the operation $b_1$), this stripping being achieved by means of an aqueous phase; and $b_3$) an operation for washing the aqueous phase obtained at the end of the operation $b_1$) in order to remove from this phase the uranium and neptunium fractions having followed plutonium in the aqueous phase during said operation $b_1$), this washing being carried out by means of a solvent phase of the same composition as the one used in step a).

In which case, plutonium being more stable in an aqueous solution in the oxidized state than in the reduced state, step c) preferably comprises:

$c_1$) an oxidation operation for bringing the plutonium(III) present in the aqueous phase obtained at the end of the operation $b_3$) to the oxidation state IV;

$c_2$) an operation for concentrating the aqueous phase obtained at the end of the oxidation operation in order to reduce the volume of this phase; and $c_3$) an operation for storing the thereby concentrated aqueous phase.

Also in which case, step d) preferably comprises:

$d_1$) an operation for extracting the plutonium(IV) present in the aqueous phase obtained at the end of step c), this extraction being achieved by means of a solvent phase with the same composition as the one used in step a);

$d_2$) an operation for washing the solvent phase obtained at the end of the operation $d_1$) for removing from this phase the fission products having followed plutonium into the solvent phase during said operation $d_1$), this washing being achieved by means of a nitric aqueous phase;

$d_3$) an operation for stripping the plutonium present in the thereby washed solvent phase, this plutonium being stripped in the oxidation state III by means of a nitric aqueous phase containing a reducing agent with which plutonium(IV) may be reduced into plutonium(III), for example hydroxylammonium nitrate stabilized with hydrazinium nitrate;

as well as at least one addition of uranium(IV) to the plutonium, this addition being preferably carried out at the end of the operation $b_3$).

An aqueous phase is thereby obtained which contains plutonium(III) and uranium(IV) but which no longer contains any fission products and which may therefore be subject to the co-conversion step e) for obtaining a mixed oxide$(U,Pu)O_2$.

In a second preferred embodiment of the method of the invention, step b) is achieved so that the first aqueous phase contains plutonium and uranium but without any neptunium, and so that the second aqueous phase contains uranium and neptunium but without any plutonium.

Consequently, in this second embodiment, step b) preferably comprises:

$b_1$) an operation for stripping the plutonium and a fraction of the uranium present in the solvent phase obtained at the end of step a), this plutonium and this uranium being stripped in the oxidation states III and VI respectively by means of a nitric aqueous phase containing a reducing agent with which plutonium(IV) may be reduced into plutonium(III) and neptunium(VI) into neptunium(IV), without reducing the uranium, for example uranium(IV) stabilized with hydrazinium nitrate;

$b_2$) an operation for stripping the uranium and neptunium present in the solvent phase obtained at the end of the operation $b_1$), this stripping being achieved by means of an aqueous phase; and $b_3$) an operation for washing the aqueous phase obtained at the end of operation $b_1$) for removing from this phase the neptunium fraction having followed the plutonium and uranium in the aqueous phase during said operation $b_1$), this washing being achieved by means of a solvent phase of the same composition as the one used in step a), and being possibly completed by the addition of uranium(IV) or (VI) to said aqueous phase in order to compensate for the uranium fraction which may follow the neptunium in the solvent phase.

In which case, step c) preferably comprises:

$c_1$) an oxidation operation for bringing the plutonium(III) present in the aqueous phase obtained at the end of the operation $b_3$) to the oxidation state IV and, if uranium(IV) is present in this phase, for bringing this uranium(IV) to the oxidation state VI, uranium actually being like plutonium more stable in an aqueous solution in the oxidized state than in the reduced state;

$c_2$) an operation for concentrating the aqueous phase obtained at the end of the oxidation operation in order to reduce the volume of this phase; and $c_3$) an operation for storing the thereby concentrated aqueous phase.

Also in which case, step d) preferably comprises:

$d_1$) an operation for co-extracting the plutonium(IV) and uranium(VI) present in the aqueous phase obtained at the end of step c), this co-extraction being achieved by means of a solvent phase with the same composition as the one used in step a);

$d_2$) an operation for washing the solvent phase obtained at the end of the operation $d_1$) for removing from this phase the fission products having followed the plutonium and uranium in the solvent phase during said operation $d_1$), this washing being achieved by means of a nitric aqueous phase;

$d_3$) an operation for stripping the plutonium present in the thereby washed solvent phase, this plutonium being stripped in the oxidation state III by means of a nitric aqueous phase containing a reducing agent with which plutonium(IV) may be reduced into plutonium(III), for example hydroxylammonium nitrate stabilized with hydrazinium nitrate; and $d_4$) an operation for washing the aqueous phase obtained at the end of operation $d_3$) for removing from this phase the uranium(VI) having followed the plutonium(III) in the aqueous phase during said operation $d_3$), this washing being achieved by means of a solvent phase with the same composition as the one used in step a) and comprising at least one addition of uranium(IV) to said aqueous phase preferably at the end of operation $d_4$).

There also, an aqueous phase is obtained in this way, which contains plutonium(III) and uranium(IV) but which no longer contains any fission products and which may therefore be subject to the co-conversion step e) for obtaining a mixed oxide$(U,Pu)O_2$.

In a third embodiment of the method of the invention, step b) is carried out so that the first aqueous phase contains both plutonium, uranium and neptunium, and that the second aqueous phase contains uranium but without any plutonium or neptunium.

Consequently, in this third embodiment, step b) preferably comprises:

$b_1$) an operation for stripping the plutonium, the neptunium and a fraction of the uranium present in the solvent phase obtained at the end of step a), this plutonium, this neptunium and this uranium being stripped in the oxidation states III, V and VI respectively by means of a nitric aqueous phase containing a reducing agent with which plutonium(IV) may be reduced into plutonium(III) and neptunium(VI) into neptunium(V) without reducing the uranium, for example hydroxylammonium nitrate stabilized with hydrazium nitrate; and $b_2$) an operation for stripping the uranium present in the solvent phase obtained at the end of operation $b_1$), this stripping being achieved by means of an aqueous phase.

In which case, step c) preferably comprises:

$c_1$) an oxidation operation for bringing the plutonium(III) and the neptunium(V) present in the aqueous phase obtained at the end of operation $b_2$) to the oxidation states IV and VI, respectively;

$c_2$) an operation for concentrating the phase obtained at the end of the oxidation operation in order to reduce the volume of this phase; and $c_3$) an operation for storing the thereby concentrated aqueous phase.

Also in which case, step d) preferably comprises:

$d_1$) an operation for co-extracting the plutonium(IV), uranium(VI) and neptunium(VI) present in the aqueous phase obtained at the end of step c), this co-extraction being achieved by means of a solvent phase with the same composition as the one used in step a);

$d_2$) an operation for washing the solvent phase obtained at the end of operation $d_1$) in order to remove from this phase the fission products having followed the plutonium, uranium and neptunium into the solvent phase during said operation $d_1$), this washing being achieved by means of a nitric aqueous phase;

$d_3$) an operation for stripping the plutonium and neptunium present in the thereby washed solvent phase, this plutonium and this neptunium being stripped respectively in the oxidation states III and (V) respectively by means of a nitric aqueous phase containing a reducing agent with which plutonium (IV) may be reduced into plutonium(III) and neptunium(VI) into neptunium(V), for example hydroxylammonium nitrate stabilized with hydrazinium nitrate; and $d_4$) an operation for washing the aqueous phase obtained at the end of operation $d_3$) in order to remove from this phase the uranium(VI) having followed the plutonium(III) and the neptunium(V) in the aqueous phase during said operation $d_3$), this washing being achieved by means of a solvent phase with the same composition as the one used in step a) and comprising at least one addition of uranium(IV) to said aqueous phase, preferably at the end of operation $d_4$).

As the addition of uranium(IV) is expressed by a reduction of the neptunium(V) into neptunium(IV), an aqueous phase is thereby obtained which contains plutonium(III), uranium (IV) and neptunium(IV) and which no longer contains any fission products and which may therefore be subject to the co-conversion step e) for obtaining a mixed oxide (U,Pu,Np)$O_2$.

Regardless of the method for applying the method of the invention, step e) is preferably carried out as described in the PCT international application published under No. WO 2005/119699 [2], i.e.:

by stabilizing the plutonium in the oxidation state III, the uranium in the oxidation state IV and, if necessary the neptunium in the oxidation state IV, with a monocharged cation only consisting of atoms selected from oxygen, carbon, nitrogen and hydrogen atoms like the hydrazinium cation;

by co-precipitating the thereby stabilized plutonium, uranium and if necessary neptunium, with oxalic acid or with one of its salts or of its derivatives; and by calcinating the resulting co-precipitates, preferably under an inert or very slightly oxidizing gas, for example a gas comprising in majority argon, for removing the carbon and for avoiding the formation of $U_3O_8$.

The thereby obtained mixed oxide, which appears as a powder, may then be directly used for making pellets of a nuclear MOX fuel for example with the MIMAS (MIcronized MASter Blend) method.

With view to its use for making MOX nuclear fuels, this mixed oxide preferably has a mass ratio U/Pu equal to or substantially equal to 50/50 when it does not contain any neptunium, and a mass ratio U/Pu/Np equal to or substantially equal to 49/49/2 when it contains neptunium.

According to the invention, it is possible to adjust either between step d) and step e), or at the beginning of step e) just before stabilizing the plutonium, the uranium and possibly the neptunium, the mass ratio U/Pu or U/Pu/Np of the aqueous phase obtained at the end of step d) to the one of the mixed oxide which is desirably obtained.

However, it is preferred that the aqueous phase obtained at the end of step d) straightaway has a mass ratio U/Pu or U/Pu/Np compliant with the one of this mixed oxide or only requiring a very slight subsequent adjustment.

The result of this is that in the three preferred embodiments which have just been described, the uranium(IV) which is added to the plutonium during step d) is preferably added in an amount such that the aqueous phase obtained at the end of this step has a mass ratio U/Pu or U/Pu/Np compliant with the one of the mixed oxide obtained in step e).

Moreover, regardless of the embodiment of the method of the invention, it is preferred that the duration of step c) be at least fifteen days and preferably comprised between one month and twelve months, being aware that in this step, the operations $c_1$) and $c_2$) have negligible durations relatively to the duration of the storage operation $c_3$).

Further it is preferred that the aqueous phase stored during the operation $c_3$) have a content of plutonium or of a mixture of plutonium and uranium or further of a mixture of plutonium, uranium and neptunium from 200 to 250 g/L.

As one skilled in the art will have understood upon reading the foregoing, the extractant of the solvent phase which is used in step a) and, as a result in steps b) and d), is preferably selected from extractants which more strongly complex the actinides found in the oxidation state IV and/or VI than the actinides found in the oxidation state III and/or V.

This extractant may notably be a tri-alkyl phosphate such as tri-n-butyl phosphate (or TBP), tri-isobutylphosphate (or TiBP) or further tri-isoamylphosphate.

The organic diluant in which this extractant is found may itself be selected from the different hydrocarbons proposed for liquid-liquid extractions such as toluene, xylene, t-butyl-benzene, tri-isopropylbenzene, kerosene and dodecanes, kerosene and linear or branched dodecanes, such as n-dodecane and hydrogenated tetrapropylene (or HTP).

However, like in the PUREX method, the use of solvent phases is preferred, which contain tri-n-butyl phosphate in a dodecane and this in a volume ratio equal to or substantially equal to 30/70.

In which case, step a) preferably comprises:
a first operation for co-extracting the uranium, plutonium and neptunium present in the nitric aqueous phase resulting from the dissolution of the used nuclear fuel, this co-extraction being carried out by means of a solvent phase as defined above;
a first operation for washing the solvent phase obtained at the end of the co-extraction operation in order to remove from this phase a portion of the fission products, in particular ruthenium and zirconium, having followed the uranium, plutonium and neptunium in the solvent phase, this washing being carried out by means of a nitric aqueous phase preferably containing from 1 to 3 mol/L of nitric acid;
a second operation for washing the solvent phase obtained at the end of the co-extraction operation in order to remove from this phase, technetium having followed the uranium, plutonium and neptunium in the solvent phase, this washing being carried out by means of a nitric aqueous phase preferably containing from 3 to 5 mol/L of nitric acid; and
an operation for co-extracting the uranium, plutonium and neptunium present in the aqueous phase obtained at the end of the second washing operation, this co-extraction being carried out by means of a solvent phase with the same composition as the one used for the first co-extraction operation.

In which case also:
the nitric aqueous phase used for the operations $b_1$) preferably contains from 0.05 to 1 mol/L of nitric acid, while the aqueous phase used during the operations $b_2$) preferably contains from 0 to 0.05 mol/L of nitric acid;
the nitric aqueous phase used for the operations $d_2$) preferably contains from 1 to 3 mol/L of nitric acid, while the nitric aqueous phase used for the operations $d_3$) preferably contains from 0.05 to 2 mol/L of nitric acid.

The method of the invention further comprises operations for purifying the uranium present in the second aqueous phase obtained at the end of step b) so as to enhance its decontamination from fission products and possibly to separate it from neptunium if said step b) is carried out so that this second aqueous phase contains both uranium and neptunium. These operations may be carried out like in any conventional PUREX method (see, for example the article BN 3 650 of the treatise "Génie Nucléaire" (Nuclear Engineering) from the "Techniques de l'Ingénieur", [3]).

Other advantages and characteristics of the method of the invention will become apparent upon reading the additional description which follows and which refers to exemplary embodiments on an industrial scale of this method.

Of course, these examples are only given as illustrations of the invention and are by no means a limitation thereof.

In these figures, the rectangles referenced from 1 to 13 represent multi-staged extractors such as those conventionally used in the processing of irradiated nuclear fuels (mixers-decantors, pulsed columns, centrifugal extractors).

The solvent phases entering and exiting these extractors are symbolized with dotted lines, while the aqueous phases entering and exiting these extractors are symbolized with solid lines.

DETAILED DESCRIPTION OF THE PREFERRED EMBODIMENT

Figure 1:
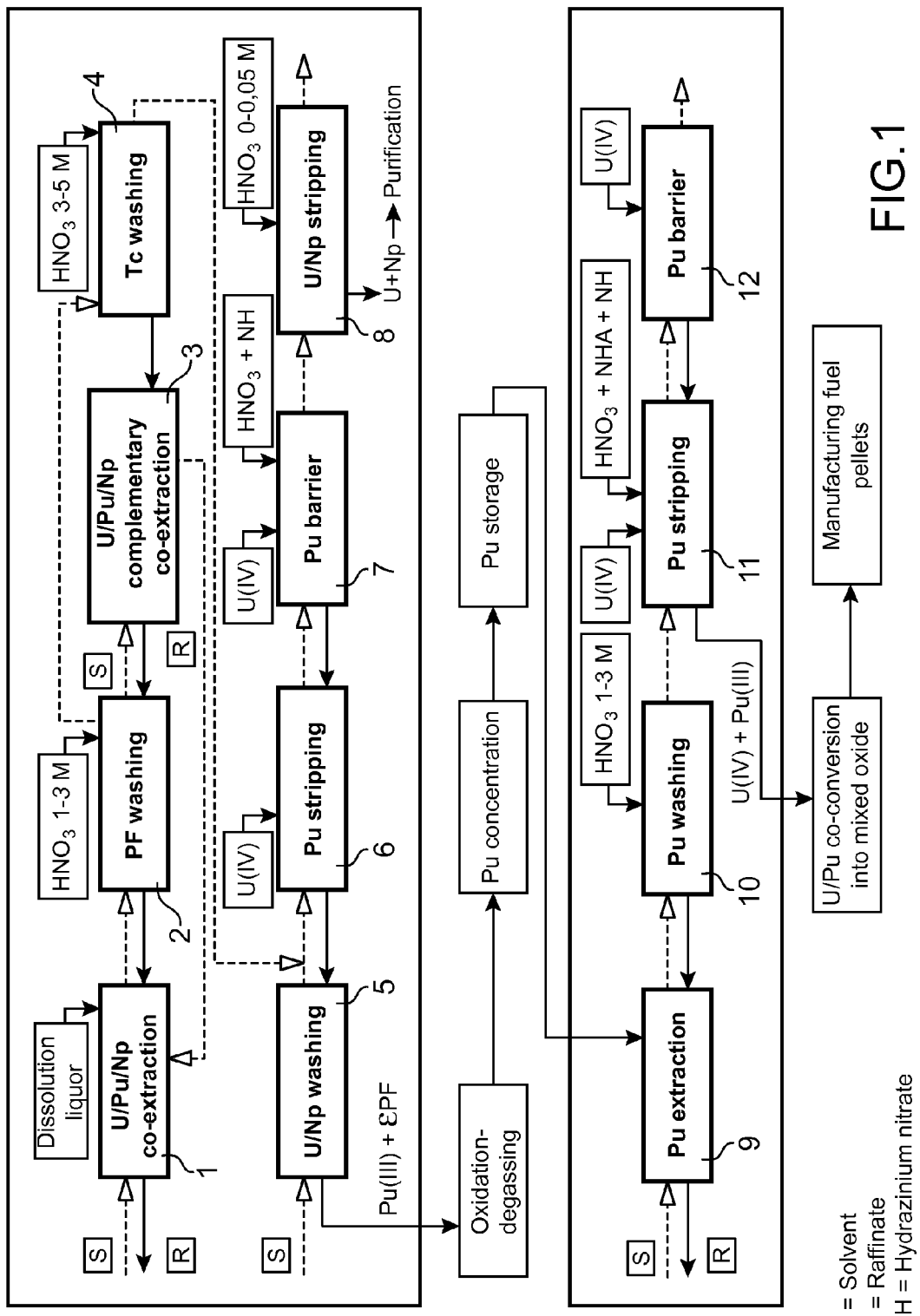
FIG. 1 illustrates a block diagram of a first embodiment of the method of the invention, designed for obtaining a mixed oxide $(U/Pu)O_2$.

First of all reference is made to FIG. 1 which illustrates a block diagram of a first embodiment of the method of the invention, designed in order to obtain a mixed oxide of uranium and plutonium, which may be directly used for making a MOX nuclear fuel, from a dissolution liquor obtained beforehand by dissolving a used nuclear fuel, for example $UO_2$, in nitric acid and by clarifying the resulting mixture.

Such a dissolution liquor typically contains from 200 to 300 g/L of uranium for 2 to 3 g/L of plutonium. It also contains neptunium, americium, curium and fission products. Its acidity is generally of the order of 3 M.

As mentioned earlier, the method according to the invention has for a first step, a step which aims at decontaminating uranium, plutonium and neptunium from actinides(III), i.e. americium and curium, and from the major portion of the fission products.

As visible in FIG. 1, this decontamination step comprises:

an operation, designated as <<U/Pu/Np co-extraction>>, which aims at extracting together uranium, plutonium and neptunium, the first in the oxidation state VI, the second in the oxidation state IV and the third in the oxidation state VI, from the dissolution liquor, by putting this liquor in contact with a solvent phase containing 30% (v/v) of TBP in a dodecane, for example HTP;

an operation, designated as <<PF washing>>, which aims at removing from the solvent phase the fission products, in particular ruthenium and zirconium, having been extracted during the <<U/Pu/Np co-extraction>>, by putting the solvent phase from this co-extraction in contact with a nitric aqueous phase with moderate acidity, for example a 1 to 3 M nitric acid solution;

an operation, designated as <<Tc washing>>, which aims at removing from the solvent phase the technetium having been extracted during the <<U/Pu/Np co-extraction>> by putting the solvent phase from the <<PF washing>> in contact with a nitric aqueous phase with moderate acidity but higher acidity than that of the nitric aqueous phase used for the <<PF washing>>, for example a 3 to 5 M nitric acid solution; and an operation designated as <<U/PU/NP complementary co-extraction>>, which aims at recovering the fractions of uranium, plutonium and neptunium having followed the technetium in the aqueous phase during the <<Tc washing>>, by putting this phase in contact with a solvent phase, also consisting of 30% (v/v) of TBP in HTP.

Four phases are thereby obtained:

both aqueous phases (or raffinates) from the <<U/Pu/Np co-extraction>> and from the <<U/PU/NP complementary co-extraction>>, which are loaded with fission products and for the first of them with actinides(III), and which are removed from the cycle;

the solvent phase from the <<U/PU/NP complementary co-extraction>>, which is sent towards the extractor where <<U/Pu/Np co-extraction>> occurs in order to be added to the solvent phase circulating in this extractor; and the solvent phase from the <<Tc washing>>, which is loaded with U(VI), Pu(IV) and Np(VI).

This last solvent phase is directed towards a series of extractors (5-8) in which the second step of the method is carried out, i.e. the partition of the uranium, plutonium and neptunium into two aqueous phases.

In the present embodiment, this partition is achieved in the same way as in the PUREX method applied in the factory UP2-800 of La Hague.

It therefore comprises:

an operation, designated as <<Pu stripping>>, which aims at stripping the plutonium of the solvent phase from the <<Tc washing>>, by putting this phase into contact with a nitric aqueous phase with low acidity, for example a 0.05 to 2 M nitric acid solution, containing a reducing agent which reduces Pu(IV) into Pu(III) and Np(VI) into Np(IV) (the latter being extractable with TBP) without reducing the uranium, as well as an anti-nitrous agent, the role of which is to stabilize the reducing agent, the Pu(III) and the Np(IV) by destroying the nitrous acid which tends to form; this reducing agent is for example uranium(IV) while the anti-nitrous agent is for example hydrazinium nitrate;

an operation, designated as <<Pu barrier>>, which aims at enhancing stripping of the plutonium, by putting the solvent phase from the <<Pu stripping>> in contact with a nitric aqueous phase with low acidity, for example a 0.05 to 1 M nitric acid solution, containing the same reducing agent and the same anti-nitrous agent as those used for the <<Pu stripping>>;

an operation, designated as <<U/Np stripping>>, which aims at stripping from the solvent phase stemming from the <<Pu stripping>>, the uranium and neptunium, by putting this phase into contact with an aqueous phase, for example a nitric acid solution with a molarity not exceeding 0.05 M;

and an operation, designated as <<U/Np washing>>, which aims at removing from the aqueous phase stemming from the <<Pu stripping>>, the fractions of uranium and neptunium having followed the plutonium during the <<Pu stripping>>, by putting this phase in contact with a solvent phase consisting of 30% (v/v) of TBP in HTP.

Three phases are thereby obtained:

the solvent phase from the <<U/Np stripping>>, which no longer contains any uranium or plutonium or neptunium and which is directed towards a series of extractors (not shown in FIG. 1) in which it will be subject to a purification treatment (removal of the impurities and degradation products of TBP) with view to its recycling;

the aqueous phase from the <<U/Np stripping>>, which contains more than 99.9% of uranium and from 70 to 80% of the neptunium initially present in the dissolution liquor and which is directed towards a series of extractors (not shown in FIG. 1) in which the uranium and neptunium will be separated from each other and the uranium will be purified with regard to the fission products; and the aqueous phase from the <<U/Np washing>>, which contains more than 99% of the plutonium initially present in the dissolution liquor as well as fission products in trace amounts, the presence of these traces being however sufficient for making a use of plutonium very complicated for military purposes.

The latter aqueous phase is then sent towards a unit where it is successively subject to an oxidation operation allowing plutonium(III) to be brought back to the oxidation state IV, to a concentration operation intended to reduce its volume and to a storage operation.

The oxidation operation is for example carried out by circulating this phase under a stream of nitrogen oxides $NO_x$ so as to destroy the anti-nitrous agent which it contains—which allows nitrous acid to be re-formed and to re-oxidize the plutonium(III) into plutonium(IV)—and by then removing the excess nitrous acid by breaking down this acid into NO and $NO_2$ and degassing the thereby formed nitrogen oxides.

The concentration operation is for example carried out by evaporation, preferably until an aqueous phase containing from 200 to 250 g/L of plutonium is obtained.

As for the storage operation, it is for example carried out in tanks with a network of tubes, during a period of at least fifteen days and which may range up to twelve months, with which it is possible to ensure functional decoupling between the workshops responsible for the processing of used nuclear fuels, in charge of the operations located upstream (shearing of the fuel pencils, dissolution of the fuels, clarification of the solutions, decontamination and partition) and the workshops in charge of operations located downstream (purification, co-conversion, MOX fuel manufacturing).

At the end of this storage, the aqueous phase is directed towards a series of extractors (9-12) in which the fourth step of the method is carried out, i.e. the purification of the plutonium with regard to the traces of the fission products still present in this phase.

This purification comprises:

an operation, designated as <<Pu extraction>>, which aims at extracting the plutonium in the oxidation step IV from the aqueous phase stemming from the storage, by putting this phase into contact with a solvent phase consisting of 30% (v/v) TBP in HTP;

an operation, designated as <<PF washing>>, which aims at removing from the solvent phase stemming from the <<Pu extraction>> the fission products having been extracted during this extraction, by putting this phase into contact with a nitric aqueous phase with moderate acidity, for example a 1 to 3 M solution of nitric acid; and an operation, designated as <<Pu stripping>>, which aims at stripping the plutonium from the solvent phase stemming from the <<PF washing>>, by putting this phase into contact with a nitric aqueous phase with low acidity, for example a 0.05 to 2 M nitric acid solution, containing a reducing agent with which Pu(IV) may be reduced into Pu(III), for example hydroxylammonium nitrate (or NHA), stabilized by an anti-nitrous agent of the hydrazinium nitrate type, and which comprises the addition of uranium(IV) to said aqueous phase, preferably just before it leaves the extractor 11, in an amount such that it may have at the outlet of the extractor, a U(IV)/Pu(III) mass ratio compliant with that of the mixed oxide $(U,Pu)O_2$ which is desirably made, for example of 50/50 or substantially equal to 50/50.

Three phases are thereby obtained:

the solvent phase stemming from the <<Pu barrier>>, which no longer contains any plutonium and which is sent towards the series of extractors dedicated to the purification of the solvent phases;

the aqueous phase stemming from the <<Pu extraction>>, which contains fission products and which is removed from the cycle; and the aqueous phase stemming from the <<Pu stripping>>, which contains a mixture of uranium(IV) and of plutonium(III) and which is directly sent towards a workshop where the fifth step of the method is carried out, i.e. co-conversion of this mixture into a mixed oxide.

As mentioned earlier, this co-conversion is preferably carried out with the method described in the aforementioned reference [2], i.e. by co-precipitation by means of oxalic acid or of one of its salts or one of its derivatives, of uranium(IV) and of plutonium(III) stabilized beforehand by a monocharged cation exclusively consisting of atoms selected from oxygen, carbon, nitrogen and hydrogen atoms, such as the hydrazinium cation, or by a compound such as a salt, capable of forming such a cation, and then by calcination of the resulting co-precipitate, preferably under an inert gas or a slightly oxidizing gas, for example a gas comprising in majority argon.

The thereby obtained mixed oxide $(U/Pu)O_2$, which appears as a powder, may then be directly used for making pellets of MOX nuclear fuel, for example with a method of the MIMAS type, in which case this powder is sifted, mixed with uranium oxide and optionally with scraps from the manufacturing of pellets in the form of chamottes, and then the resulting mixture is subject to pelletization and then to sintering.

Figure 2:
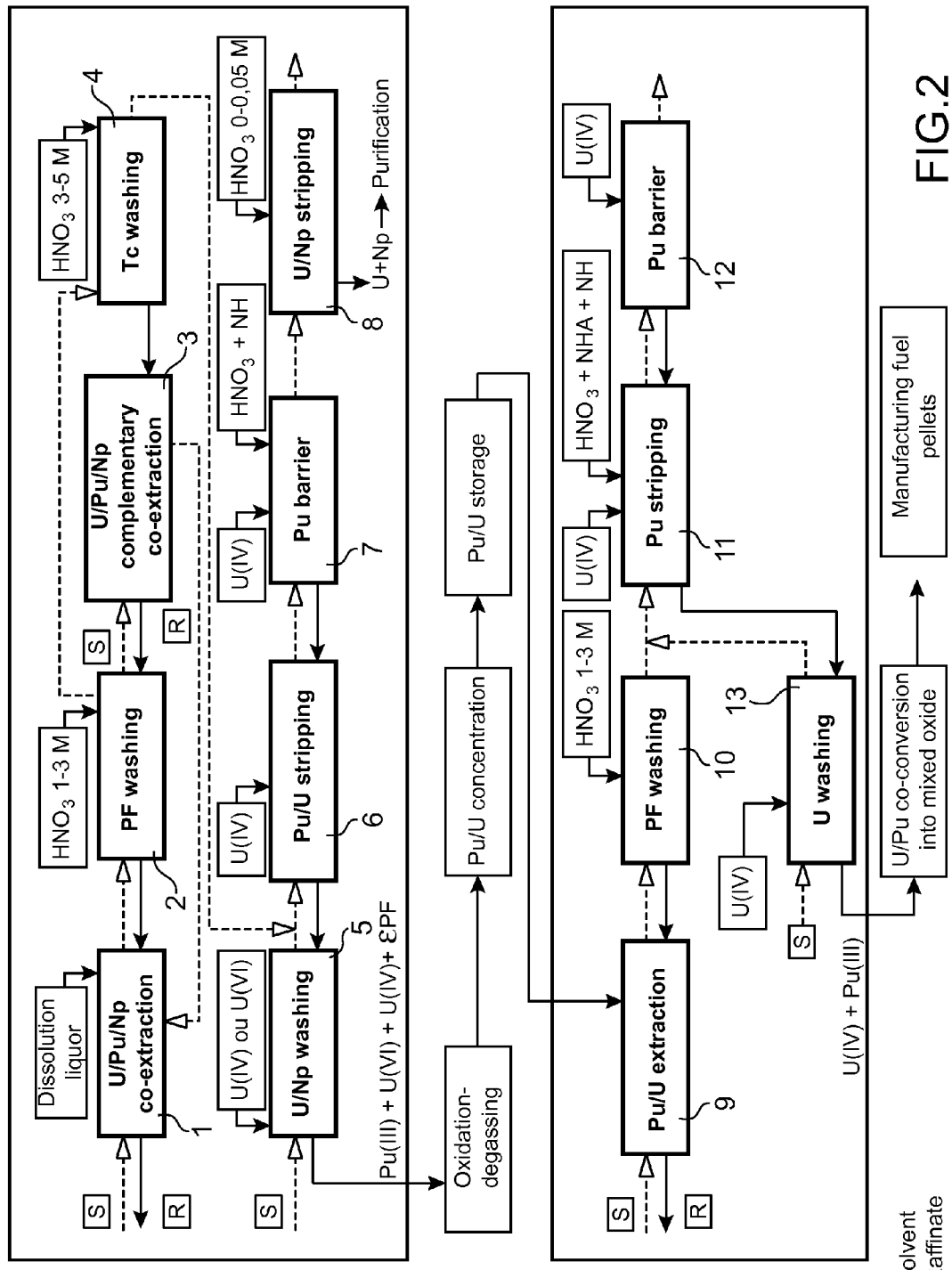
FIG. 2 illustrates a block diagram of a second embodiment of the method of the invention, also designed for obtaining a mixed oxide $(U/Pu)O_2$.

Now reference is made to FIG. 2 which illustrates a block diagram of a second embodiment of the method of the invention, designed like the previous one for obtaining a mixed oxide of uranium and of plutonium, which may be directly used for making a MOX nuclear fuel, from a dissolution liquor of a used nuclear fuel, for example $UO_2$.

In this second embodiment, the decontamination of the uranium, plutonium and neptunium from actinides(III) and from the major portion of the fission products is carried out like in the first embodiment described earlier.

On the other hand, the partition is carried out like in the embodiment of the COEX™ method which is illustrated in FIG. 1 of reference [1].

Thus it comprises:

an operation, designated as <<Pu/U stripping>>, which aims at stripping the plutonium and a fraction of the uranium from the solvent phase stemming from the <<Tc washing>> by putting this phase into contact with a nitric aqueous phase with low acidity, for example a 0.05 to 2 M nitric acid solution, containing a reducing agent which reduces Pu(IV) into Pu(III) and Np(VI) into Np(IV) without reducing the uranium(VI), for example uranium(IV) stabilized by an anti-nitrous agent, for example hydrazinium nitrate;

an operation, designated as <<Pu barrier>>, which aims at enhancing the stripping of the plutonium, by putting the solvent phase stemming from the <<Pu/U stripping>>, in contact with a nitric aqueous phase with low acidity, for example a 0.05 to 1 M nitric acid solution, containing the same reducing agent and the same anti-nitrous agent as those used for the <<Pu/U stripping>>;

an operation, designated as <<U/Np stripping>>, which aims at stripping from the solvent phase stemming from the <<Pu barrier>> the uranium and neptunium present in this phase, by putting said phase into contact with an aqueous phase, for example a solution of nitric acid with a molarity not exceeding 0.05 M; and an operation, designated as <<Np washing>>, which aims at removing from the aqueous phase stemming from the <<Pu/U stripping>>, the fraction of neptunium having followed the plutonium and uranium during this stripping, by putting this phase into contact with a solvent phase containing 30% (v/v) of TBP in HTP, and which comprises the addition of uranium(IV) or uranium(VI) to said aqueous phase, preferably just before it leaves the extractor 11, in order to compensate for the fraction of uranium which may have followed the neptunium in the solvent phase during this washing.

Three phases are thereby obtained:

the solvent phase stemming from the <<U/Np stripping>> which no longer contains uranium or plutonium or neptunium and which is directed towards a series of extractors (not shown in FIG. 1) in which it will be subject to a purification treatment (removal of the impurities and degradation products of TBP) with view to its recycling;

the aqueous phase stemming from the <<U/Np stripping>> which contains from 99 to 99.9% of the uranium and 70 to 80% of the neptunium initially present in the dissolution liquor and which is directed towards a series of extractors (not shown in FIG. 1) in which the uranium and neptunium will be separated from each other and the uranium will be purified from fission products; and the aqueous phase from the <<Np washing>>, which contains more than 99% of the plutonium initially present in the dissolution liquor, uranium(VI) and (IV) as well as fission products in trace amounts.

The latter aqueous phase is then sent towards a unit where it is successively subject to an oxidization operation with which the plutonium(III) and the uranium(IV) may be brought back to the oxidation states IV and VI respectively, to a concentration operation and to a storage operation, which for example are carried out as described earlier.

The aqueous phase from the storage is directed towards a series of extractors (9-13) in which the step for purifying the plutonium and uranium from traces of fission products still present in this phase is carried out.

As visible in FIG. 2, this purification comprises:

an operation, designated as <<Pu/U co-extraction>>, which aims at extracting plutonium in the oxidation state VI and uranium in the oxidation state VI, from the aqueous phase stemming from the storage, by putting this phase into contact with a solvent phase consisting of 30% (v/v) of TBP in HTP;

an operation, designated as <<PF washing>>, which aims at removing from the solvent phase stemming from the <<Pu/U co-extraction>> the fission products having been extracted during this extraction and which is carried out like in the first embodiment described earlier;

an operation, designated as <<Pu stripping>>, which aims at stripping the plutonium from the solvent phase stemming from the <<PF washing>>, by putting this phase into contact with a nitric aqueous phase with low acidity, for example a 0.05 to 2 M nitric acid solution, containing a reducing agent with which Pu(IV) may be reduced into Pu(III) without reducing the uranium, for example NHA, stabilized with an anti-nitrous agent of the hydrazinium nitrate type; and an operation, designated as <<U washing>>, which aims at removing from the aqueous phase stemming from the <<Pu stripping>> the uranium(VI) having followed the plutonium(III) during this stripping, by putting this phase into contact with a solvent phase consisting of 30% (v/v) of TBP and TPH, and which comprises the addition of uranium(IV) to said aqueous phase, preferably just before it leaves the extractor 13, in an amount such that it may have at the outlet of the extractor, a U(IV)/Pu(III) mass ratio compliant with that of the mixed oxide $(U/Pu)O_2$ which is desirably made, for example of 50/50 or substantially equal to 50/50.

Three phases are thereby obtained:

the solvent phase stemming from the <<Pu barrier>>, which no longer contains any plutonium and which is sent towards the series of extractors dedicated to purification of the solvent phases;

the aqueous phase stemming from the <<Pu/U co-extraction>>, which contains fission products and which is removed from the cycle; and the aqueous phase stemming from the <<Pu stripping>>, which contains a mixture of uranium(IV) and of plutonium(III) and which is directly sent towards the workshop in charge of the co-conversion step for obtaining a mixed oxide $(U/Pu)O_2$.

There also, this co-conversion is preferably carried out as described in reference [2].

Figure 3:
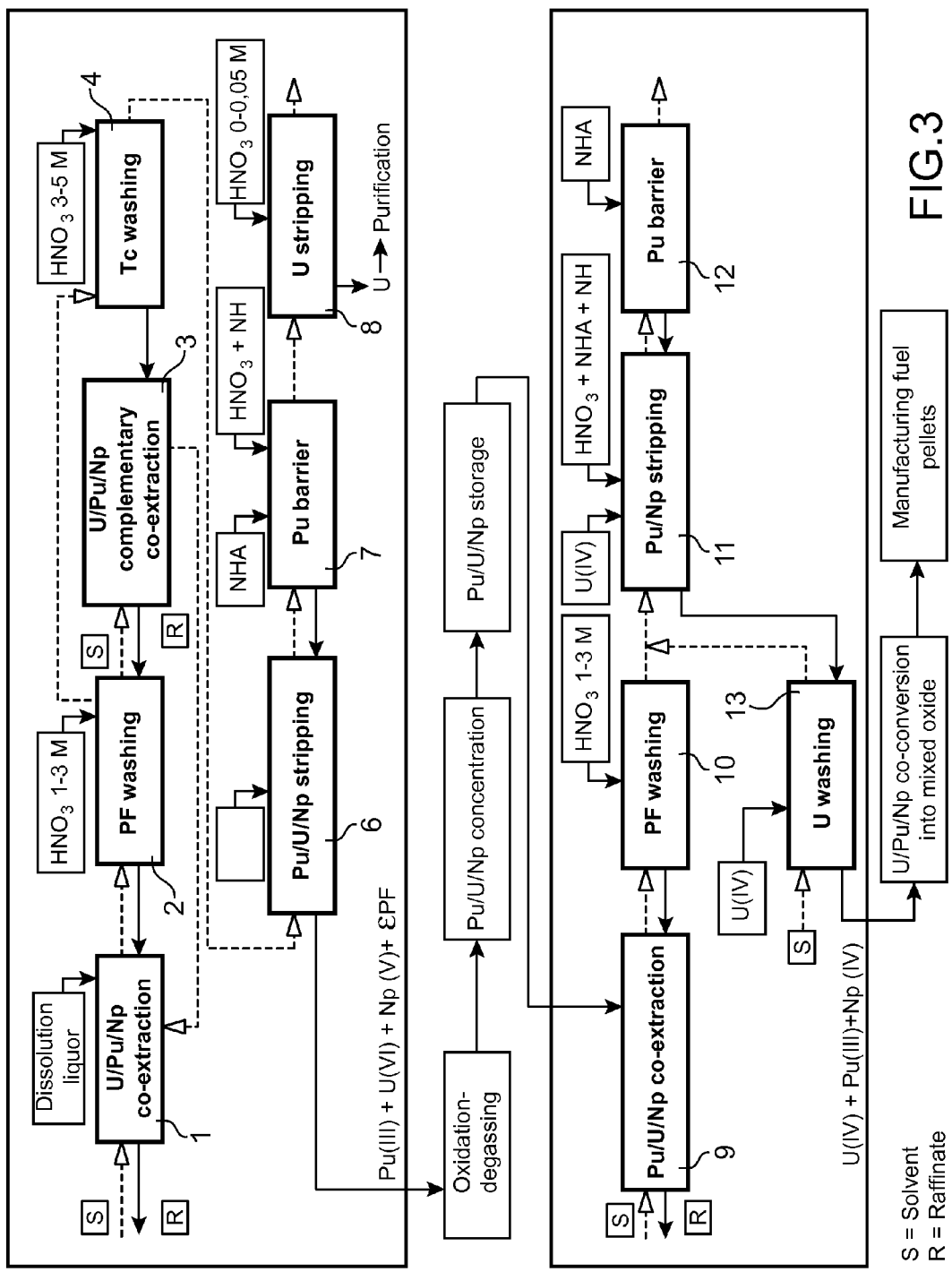
FIG. 3 illustrates a block diagram of a third embodiment of the method of the invention designed for obtaining a mixed oxide $(U/Pu/Np)O_2$.

FIG. 3 schematically illustrates a third embodiment of the method of the invention which, unlike the two previous ones, is designed for obtaining a mixed oxide of uranium, plutonium and neptunium.

This embodiment differs from the second embodiment described earlier in that the partition is carried out like in the embodiment of the COEX™ method which is illustrated in FIG. 5 of reference [1] and in that the aqueous phase which is subject to the subsequent steps of storage, purification and co-conversion not only contains plutonium and uranium but also neptunium.

Therefore and as visible in FIG. 3, in the partition:

the operation of <<Pu/U stripping>>, of the second embodiment described earlier is replaced with an operation designated as <<Pu/U/Np stripping>>, which aims at stripping plutonium, neptunium and a fraction of the uranium of the solvent phase stemming from the <<Tc washing>>, by putting this phase into contact with a nitric aqueous phase with low acidity, for example a 0.05 to 2 M nitric acid solution, containing a reducing agent which reduces PU(IV) into Pu(III) and Np(VI) into Np(V) (the latter is not very extractable with TBP) without reducing the uranium(VI), for example NHA stabilized with an anti-nitrous agent, for example hydrazinium nitrate;

the operation <<Np washing>> of the second embodiment described earlier is suppressed; while the operation <<U/Np stripping>> of the second embodiment described earlier is replaced with an operation designated as <<U stripping>>, which aims at stripping from the solvent phase the uranium present in the solvent phase stemming from the <<U barrier>>, neptunium having itself been totally stripped during the <<Pu/U/Np stripping>> and the <<Pu barrier>>, and which is carried out in the same way as said <<U/Np stripping>>.

Thus, the aqueous phase stemming from the <<Pu/U/Np stripping>> contains plutonium(III), uranium(VI), neptunium(V) and fission products in trace amounts.

This phase is then subject to oxidation, concentration and storage operations as described earlier and then directed towards a series of extractors (9-13) in which the purification step is achieved.

This step is achieved in the same way as the purification step of the second embodiment described earlier, except that, taking into account that the aqueous phase stemming from the storage contains neptunium:

the operation <<Pu/U co-extraction>> of the second embodiment described earlier is replaced with an operation designated as <<Pu/U/Np co-extraction>>, which aims at extracting the plutonium, uranium and neptunium present in said aqueous phase but which is carried out in the same way as said operation <<Pu/U co-extraction>>;

the operation <<Pu stripping>> is replaced with an operation designated as <<Pu/Np stripping>>, which aims at stripping the plutonium in the oxidation state IV and neptunium in the oxidation state III, of the solvent phase stemming from the <<PF washing>>, by putting this phase into contact with a nitric aqueous phase with low acidity, for example a 0.05 to 2 M nitric acid solution, a reducing agent allowing Pu(IV) to be reduced into Pu(III) and Np(VI) into Np(V) without reducing the uranium for example NHA, stabilized with an anti-nitrous agent of the hydrazinium nitrate type; while the amount of uranium(IV) which is added during the <<U washing>> (and which has the effect of reducing Np(V) into Np(IV)) is adjusted so as to obtain a U(IV)/Pu(III)/Np(IV) mass ratio compliant with that of the mixed oxide $(Pu,U,Np)O_2$ which is desirably made, for example of 49/49/2 or substantially equal to 49/49/2.

The method of the invention is not limited to the embodiments which have just been expressly described.

Thus, for example, it is possible to suppress the operation <<Pu barrier>> provided in the purification step of the three embodiments described earlier and to send back the solvent phase stemming from the <<Pu stripping>> (in the case of the first and second embodiments) or from the <<Pu/Np stripping>> (in the case of the third embodiment) towards the extractor 6. This solvent phase is then added to the solvent phase entering this extractor, which allows it to be depleted in plutonium.

CITED REFERENCES

[1] International PCT application WO 2007/135178
[2] International PCT application WO 2005/119699
[3] Article BN 3 650 from the treatise "Génie Nucléaire" (Nuclear Engineering) of the "Techniques de l'Ingénieur".

What is claimed is:

1. A method for processing a used nuclear fuel, which comprises:
    a) decontaminating uranium, plutonium and neptunium present in a nitric acid aqueous phase resulting from a dissolution of nuclear fuel in nitric acid, from actinides (III) and from a major portion of fission products that also are present in the nitric acid aqueous phase, the decontaminating comprising at least one co-extraction of uranium in oxidation state VI, of plutonium in oxidation state IV, and of neptunium in oxidation state VI, in a solvent phase, non-miscible with water and comprising at least one extractant in an organic diluant, and at least one washing of the solvent phase obtained at the end of the co-extraction with a nitric acid aqueous phase;
    b) partitioning the uranium, plutonium and neptunium present in the solvent phase obtained at the end of a) in a first and a second aqueous phase, the first aqueous phase either comprising plutonium without uranium or neptunium, or a mixture of plutonium and uranium without any neptunium, or further a mixture of plutonium, uranium and neptunium, and the second aqueous phase either comprising a mixture of uranium and of neptunium without any plutonium, or uranium without any plutonium or neptunium;
    c) storing the first aqueous phase obtained at the end of b);
    d) purifying the plutonium or the mixture of plutonium and uranium, or further the mixture of the plutonium, uranium and neptunium, present in the first aqueous phase obtained at the end of c) with regard to the fission products still present in said first aqueous phase, the purifying comprising at least one addition of uranium for obtaining at the end of d) an aqueous solution either comprising a mixture of plutonium and uranium or a mixture of plutonium, uranium and neptunium; and
    e) co-converting the mixture of plutonium and uranium, or the mixture of plutonium, uranium and neptunium, present in the aqueous phase obtained at the end of d), into a mixed oxide.

2. The method of claim 1, wherein the first aqueous phase obtained at the end of b) comprises plutonium without uranium or neptunium, while the second aqueous phase obtained at the end of b) comprises uranium and neptunium without plutonium.

3. The method of claim 2, wherein b) comprises:
    $b_1$) stripping the plutonium present in the solvent phase obtained at the end of a) the plutonium being stripped in oxidation state III with a nitric acid aqueous phase comprising a reducing agent with which plutonium(IV) is reduced into plutonium(III) and neptunium(VI) is reduced into neptunium(IV) without reducing the uranium;
    $b_2$) stripping the uranium and neptunium present in the solvent phase obtained at the end of $b_1$) with an aqueous phase; and
    $b_3$) washing the aqueous phase obtained at the end of $b_1$) for removing from said aqueous phase the uranium and neptunium fractions having followed the plutonium during $b_1$), the aqueous phase being washed with a solvent phase having the same composition as the solvent phase used in a).

4. The method of claim 3, wherein c) comprises:
    $c_1$) oxidizing the plutonium(III) present in the aqueous phase obtained at the end of $b_3$) into plutonium(IV);
    $c_2$) concentrating the aqueous phase obtained at the end of $c_1$); and
    $c_3$) storing the concentrated aqueous phase obtained at the end of $c_2$).

5. The method of claim 4, wherein d) comprises:
    $d_1$) extracting the plutonium(IV) present in the aqueous phase obtained at the end of c), the plutonium(IV) being extracted with a solvent phase having the same composition as the one used in a);
    $d_2$) washing the solvent phase obtained at the end of $d_1$) for removing from said solvent phase the fission products having followed the plutonium during $d_1$), the solvent phase being washed with a nitric acid aqueous phase;
    $d_3$) stripping the plutonium present in the washed solvent phase obtained at the end of $d_2$), the plutonium being striped in oxidation state III with a nitric acid aqueous phase comprising a reducing agent with which plutonium(IV) is reduced into plutonium(III);
as well as adding uranium(IV) to the plutonium.

6. The method of claim 1, wherein the first aqueous phase obtained at the end of b) comprises plutonium and uranium without neptunium, while the second aqueous phase obtained at the end of b) comprises uranium and neptunium without plutonium.

7. The method of claim 6, wherein b) comprises:
    $b_1$) stripping the plutonium and a fraction of the uranium present in the solvent phase obtained at the end of a), the plutonium and uranium being stripped in oxidation states III and VI, respectively, with a nitric acid aqueous phase comprising a reducing agent with which plutonium(IV) is reduced into plutonium(III) and neptunium (VI) is reduced into neptunium(IV) without reducing the uranium;
    $b_2$) stripping the uranium and neptunium present in the solvent phase obtained at the end of $b_1$), with an aqueous phase; and
    $b_3$) washing the aqueous phase obtained at the end of $b_1$) for removing from said aqueous phase the neptunium fraction having followed the plutonium and the uranium during $b_1$), the aqueous phase being washed with a solvent phase having the same composition as the one used in a).

8. The method of claim 7, wherein c) comprises:
    $c_1$) oxidizing the plutonium(III) present in the aqueous phase obtained at the end of $b_3$) into plutonium(IV) and, if uranium(IV) is present in said aqueous phase, oxidizing the uranium(IV) into uranium(VI);
    $c_2$) concentrating the aqueous phase obtained at the end of $c_1$); and
    $c_3$) storing the concentrated aqueous phase obtained at the end of $c_2$).

9. The method of claim 8, wherein d) comprises:
    $d_1$) co-extracting the plutonium(IV) and uranium(VI) present in the aqueous phase obtained at the end of c), the plutonium(IV) and uranium(VI) being co-extracted with a solvent phase having the same composition as the solvent phase used in a);

$d_2$) washing the solvent phase obtained at the end of $d_1$) for removing from said solvent phase the fission products having followed the plutonium and the uranium during $d_1$), the solvent phase being washed with a nitric acid aqueous phase;

$d_3$) stripping the plutonium present in the washed solvent phase obtained at the end of $d_2$), the plutonium being stripped in oxidation state III with a nitric acid aqueous phase comprising a reducing agent with which plutonium(IV) is reduced into plutonium(III); and $d_4$) washing the aqueous phase obtained at the end of $d_3$) for removing from said aqueous phase the uranium(VI) having followed the plutonium(III) during $d_3$), the aqueous phase being washed with a solvent phase having the same composition as the solvent phase used in a), and the washing comprising at least one addition of uranium (IV) to said aqueous phase.

10. The method of claim 1, wherein the first aqueous phase obtained at the end of b) comprises plutonium, uranium and neptunium, while the second aqueous phase obtained at the end of b) comprises uranium but without any plutonium or neptunium.

11. The method of claim 10, wherein b) comprises:

$b_1$) stripping the plutonium, neptunium and a fraction of the uranium present in the solvent phase obtained at the end of a), the plutonium, neptunium and uranium being stripped in oxidation states III, V and VI respectively with a nitric acid aqueous phase comprising a reducing agent with which plutonium(IV) is reduced into plutonium(III) and neptunium(VI) is reduced into neptunium(V) without reducing the uranium; and $b_2$) stripping the uranium present in the solvent phase obtained at the end of $b_1$), the uranium being stripped with an aqueous phase.

12. The method of claim 11, wherein c) comprises:

$c_1$) oxidizing the plutonium(III) and neptunium(V) present in the aqueous phase obtained at the end of $b_2$) into plutonium(IV) and neptunium(VI), respectively;

$c_2$) concentrating the aqueous phase obtained at the end of $c_1$); and $c_3$) storing the concentrated aqueous phase obtained at the end of $c_2$).

13. The method of claim 12, wherein d) comprises:

$d_1$) co-extracting the plutonium(IV), uranium(VI) and neptunium(VI) present in the aqueous phase obtained at the end of c), the plutonium(IV), uranium(VI) and neptunium(VI) being co-extracted with a solvent phase having the same composition as the solvent phase used in a);

$d_2$) washing the solvent phase obtained at the end of $d_1$) for removing from said solvent phase the fission products having followed the plutonium, the uranium and the neptunium during $d_1$), the solvent phase being washed with a nitric acid aqueous phase;

$d_3$) stripping the plutonium and neptunium present in the washed solvent phase obtained at the end of $d_2$), the plutonium and neptunium being stripped in oxidation states III and V, respectively, with a nitric acid aqueous phase comprising a reducing agent, with which plutonium(IV) is reduced into plutonium(III) and neptunium (VI) is reduced into neptunium(V); and $d_4$) washing the aqueous phase obtained at the end of $d_3$) for removing from said aqueous phase the uranium(VI) having followed the plutonium(III) and the neptunium (V) during $d_3$), the aqueous phase being washed with a solvent phase having the same composition as the solvent phase used in a), and the washing comprising at least one addition of uranium(IV) to said aqueous phase.

14. The method of claim 13, wherein the uranium(IV) is added to the plutonium in an amount such that the aqueous phase obtained at the end of d) has a mass ratio between the uranium and the plutonium identical to the mass ratio between the uranium and the plutonium of the mixed oxide obtained in e).

15. The method of claim 1, wherein the duration of c) is at least fifteen days.

16. The method of claim 4, wherein the aqueous phase stored during $c_3$) has a plutonium content from 200 to 250 g/L.

17. The method of claim 1, wherein the solvent phase used in a) comprises a tri-n-butyl phosphate in a dodecane, in a volume ratio equal to 30/70.

18. The method of claim 3, wherein a) comprises:

a first co-extraction of the uranium, plutonium and neptunium present in the nitric acid aqueous phase resulting from the dissolution of the used nuclear fuel, the uranium, plutonium and neptunium being co-extracted with a solvent phase comprising a tri-n-butyl phosphate in a dodecane, in a volume ratio equal to 30/70;

a first washing of the solvent phase obtained at the end of the first co-extraction for removing from said solvent phase ruthenium and zirconium having followed the uranium, plutonium and neptunium in the solvent phase, the solvent phase being washed with a nitric acid aqueous phase containing from 1 to 3 mol/L of nitric acid;

a second washing of the solvent phase obtained at the end of the co-extraction for removing from said solvent phase technetium having followed the uranium, plutonium and neptunium in the solvent phase, the solvent phase being washed with a nitric acid aqueous phase containing from 3 to 5 mol/L of nitric acid; and a second co-extraction of the uranium, plutonium and neptunium present in the aqueous phase obtained at the end of the second washing, the uranium, plutonium and neptunium being co-extracted with a solvent phase having the same composition as the solvent phase used for the first co-extraction.

19. The method of claim 18, wherein the nitric acid aqueous phase used during $b_1$) comprises from 0.05 to 1 mol/L of nitric acid, while the nitric acid aqueous phase used during $b_2$) comprises from 0 to 0.05 mol/L of nitric acid.

20. The method of claim 1, which further comprises purifying the uranium present in the second aqueous phase obtained at the end of b).

21. The method of claim 1, wherein the used nuclear fuel is a uranium oxide fuel or a mixed uranium and plutonium oxide fuel.

22. The method of claim 5, wherein the uranium(IV) is added to the plutonium in an amount such that the aqueous phase obtained at the end of d) has a mass ratio between the uranium and the plutonium identical to the mass ratio between the uranium and the plutonium of the mixed oxide obtained in e).

23. The method of claim 9, wherein the uranium(IV) is added to the plutonium in an amount such that the aqueous phase obtained at the end of d) has a mass ratio between the uranium and the plutonium identical to the mass ratio between the uranium and the plutonium of the mixed oxide obtained in e).

24. The method of claim 15, wherein the duration of c) is from one month to twelve months.

25. The method of claim 8, wherein the aqueous phase stored during $c_3$) has a plutonium and uranium mixture content from 200 to 250 g/L.

26. The method of claim 12, wherein the aqueous phase stored during $c_3$) has plutonium, uranium and neptunium mixture content from 200 to 250 g/L.

27. The method of claim 5, wherein a) comprises:
   a first co-extraction of the uranium, plutonium and neptunium present in the nitric acid aqueous phase resulting from the dissolution of the used nuclear fuel, the uranium, plutonium and neptunium being co-extracted with a solvent phase comprising a tri-n-butyl phosphate in a dodecane, in a volume ratio equal to 30/70;
   a first washing of the solvent phase obtained at the end of the first co-extraction for removing from said solvent phase ruthenium and zirconium having followed the uranium, plutonium and neptunium in the solvent phase, the solvent phase being washed with a nitric acid aqueous phase containing from 1 to 3 mol/L of nitric acid;
   a second washing of the solvent phase obtained at the end of the co-extraction for removing from said solvent phase technetium having followed the uranium, plutonium and neptunium in the solvent phase, the solvent phase being washed with a nitric acid aqueous phase containing from 3 to 5 mol/L of nitric acid; and
   a second co-extraction of the uranium, plutonium and neptunium present in the aqueous phase obtained at the end of the second washing, the uranium, plutonium and neptunium being co-extracted with a solvent phase having the same composition as the solvent phase used for the first co-extraction.

28. The method of claim 7, wherein a) comprises:
   a first co-extraction of the uranium, plutonium and neptunium present in the nitric acid aqueous phase resulting from the dissolution of the used nuclear fuel, the uranium, plutonium and neptunium being co-extracted with a solvent phase comprising a tri-n-butyl phosphate in a dodecane, in a volume ratio equal to 30/70;
   a first washing of the solvent phase obtained at the end of the first co-extraction for removing from said solvent phase ruthenium and zirconium having followed the uranium, plutonium and neptunium in the solvent phase, the solvent phase being washed with a nitric acid aqueous phase containing from 1 to 3 mol/L of nitric acid;
   a second washing of the solvent phase obtained at the end of the co-extraction for removing from said solvent phase technetium having followed the uranium, plutonium and neptunium in the solvent phase, the solvent phase being washed with a nitric acid aqueous phase containing from 3 to 5 mol/L of nitric acid; and
   a second co-extraction of the uranium, plutonium and neptunium present in the aqueous phase obtained at the end of the second washing, the uranium, plutonium and neptunium being co-extracted with a solvent phase having the same composition as the solvent phase used for the first co-extraction.

29. The method of claim 28, wherein the nitric acid aqueous phase used during $b_1$) comprises from 0.05 to 1 mol/L of nitric acid, while the nitric acid aqueous phase used during $b_2$) comprises from 0 to 0.05 mol/L of nitric acid.

30. The method of claim 9, wherein a) comprises:
   a first co-extraction of the uranium, plutonium and neptunium present in the nitric acid aqueous phase resulting from the dissolution of the used nuclear fuel, the uranium, plutonium and neptunium being co-extracted with a solvent phase comprising a tri-n-butyl phosphate in a dodecane, in a volume ratio equal to 30/70;
   a first washing of the solvent phase obtained at the end of the first co-extraction for removing from said solvent phase ruthenium and zirconium having followed the uranium, plutonium and neptunium in the solvent phase, the solvent phase being washed with a nitric acid aqueous phase containing from 1 to 3 mol/L of nitric acid;
   a second washing of the solvent phase obtained at the end of the co-extraction for removing from said solvent phase technetium having followed the uranium, plutonium and neptunium in the solvent phase, the solvent phase being washed with a nitric acid aqueous phase containing from 3 to 5 mol/L of nitric acid; and
   a second co-extraction of the uranium, plutonium and neptunium present in the aqueous phase obtained at the end of the second washing, the uranium, plutonium and neptunium being co-extracted with a solvent phase having the same composition as the solvent phase used for the first co-extraction.

31. The method according to claim 30, wherein the nitric acid aqueous phase used during $d_2$) comprises from 1 to 3 mol/L of nitric acid, while the nitric acid aqueous phase used during $d_3$) comprises from 0.05 to 2 mol/L of nitric acid.

32. The method of claim 11, wherein a) comprises:
   a first co-extraction of the uranium, plutonium and neptunium present in the nitric acid aqueous phase resulting from the dissolution of the used nuclear fuel, the uranium, plutonium and neptunium being co-extracted with a solvent phase comprising a tri-n-butyl phosphate in a dodecane, in a volume ratio equal to 30/70;
   a first washing of the solvent phase obtained at the end of the first co-extraction for removing from said solvent phase ruthenium and zirconium having followed the uranium, plutonium and neptunium in the solvent phase, the solvent phase being washed with a nitric acid aqueous phase containing from 1 to 3 mol/L of nitric acid;
   a second washing of the solvent phase obtained at the end of the co-extraction for removing from said solvent phase technetium having followed the uranium, plutonium and neptunium in the solvent phase, the solvent phase being washed with a nitric acid aqueous phase containing from 3 to 5 mol/L of nitric acid; and
   a second co-extraction of the uranium, plutonium and neptunium present in the aqueous phase obtained at the end of the second washing, the uranium, plutonium and neptunium being co-extracted with a solvent phase having the same composition as the solvent phase used for the first co-extraction.

33. The method of claim 32, wherein the nitric acid aqueous phase used during $b_1$) comprises from 0.05 to 1 mol/L of nitric acid, while the nitric acid aqueous phase used during $b_2$) comprises from 0 to 0.05 mol/L of nitric acid.

34. The method of claim 13, wherein a) comprises:
   a first co-extraction of the uranium, plutonium and neptunium present in the nitric acid aqueous phase resulting from the dissolution of the used nuclear fuel, the uranium, plutonium and neptunium being co-extracted with a solvent phase comprising a tri-n-butyl phosphate in a dodecane, in a volume ratio equal to 30/70;
   a first washing of the solvent phase obtained at the end of the first co-extraction for removing from said solvent phase ruthenium and zirconium having followed the uranium, plutonium and neptunium in the solvent phase, the solvent phase being washed with a nitric acid aqueous phase containing from 1 to 3 mol/L of nitric acid;
   a second washing of the solvent phase obtained at the end of the co-extraction for removing from said solvent phase technetium having followed the uranium, plutonium and neptunium in the solvent phase, the solvent phase being washed with a nitric acid aqueous phase containing from 3 to 5 mol/L of nitric acid; and a second co-extraction of the uranium, plutonium and neptunium present in the aqueous phase obtained at the end of the second washing, the uranium, plutonium and neptunium being co-extracted with a solvent phase having the same composition as the solvent phase used for the first co-extraction.

35. The method according to claim 34, wherein the nitric acid aqueous phase used during $d_2$) comprises from 1 to 3 mol/L of nitric acid, while the nitric acid aqueous phase used during $d_3$) comprises from 0.05 to 2 mol/L of nitric acid.

36. The method according to claim 27, wherein the nitric acid aqueous phase used during $d_2$) comprises from 1 to 3 mol/L of nitric acid, while the nitric acid aqueous phase used during $d_3$) comprises from 0.05 to 2 mol/L of nitric acid.

* * * * *